US005662754A

United States Patent [19]

Marusawa et al.

[11] Patent Number: 5,662,754

[45] Date of Patent: Sep. 2, 1997

[54] METHOD OF MAKING A HIGH FREQUENCY NON-RECIPROCAL CIRCUIT ELEMENT

[75] Inventors: Hiroshi Marusawa; Takashi Kawanami; Takehiro Kounoike; Kunisaburo Tomono, all of Nagaokakyo, Japan

[73] Assignee: Murata Manufacturing Co., Ltd., Japan

[21] Appl. No.: 321,925

[22] Filed: Oct. 12, 1994

Related U.S. Application Data

[62] Division of Ser. No. 101,895, Aug. 2, 1993, Pat. No. 5,379,004.

[30] Foreign Application Priority Data

Aug. 5, 1992 [JP] Japan .................................... 4-208963

[51] Int. Cl.[6] ............................ B32B 31/26; B32B 31/12

[52] U.S. Cl. ............................ 156/89; 156/145; 156/242; 156/277; 333/1.1; 29/602.1

[58] Field of Search .................................... 333/1.1, 24.1, 333/24.2; 156/89, 145, 277, 242; 264/61, 59

[56] References Cited

U.S. PATENT DOCUMENTS

| | | |
|---|---|---|
| 5,384,434 | 1/1995 | Mandai et al. . |
| 5,419,947 | 5/1995 | Dejima et al. ........................ 333/1.1 X |
| 5,515,022 | 5/1996 | Tashiro et al. . |

FOREIGN PATENT DOCUMENTS

| | | |
|---|---|---|
| 2-60109 | 2/1990 | Japan . |

*Primary Examiner*—David A. Simmons
*Assistant Examiner*—M. Curtis Mayes
*Attorney, Agent, or Firm*—Ostrolenk, Faber, Gerb & Soffen, LLP

[57] ABSTRACT

A high-frequency non-reciprocal circuit element comprises a high-frequency-use magnetic layer and a plurality of center electrodes arranged therein to intersect with each other while being electrically insulated from each other. The plurality of center electrodes are advantageously embedded in the high-frequency-use magnetic layer or layers to be integrated with the same.

10 Claims, 7 Drawing Sheets

Fig. 9(a)
Fig. 9(c)
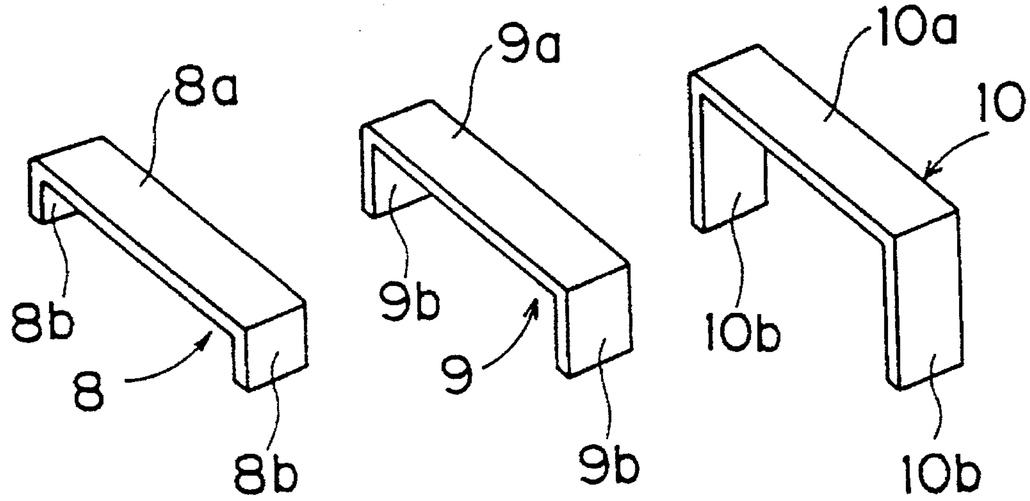
Fig. 9(b)
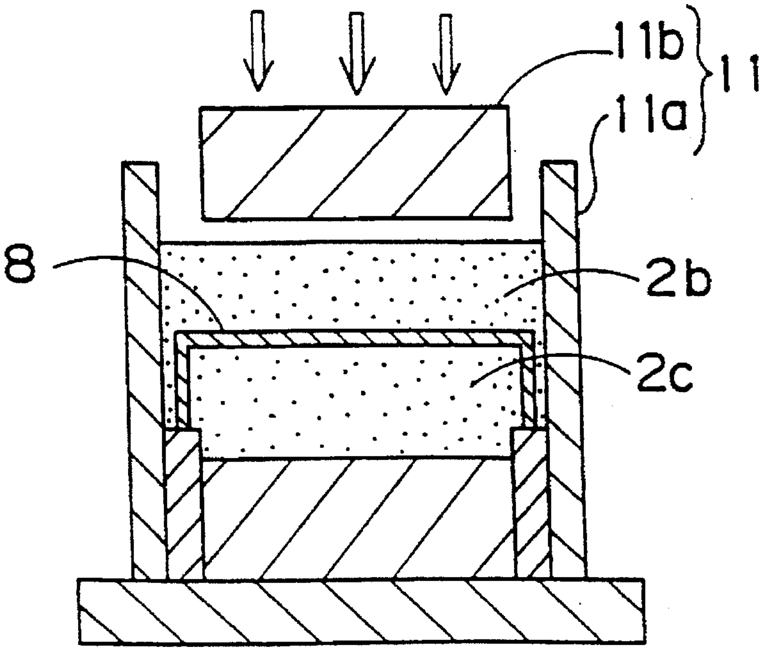
Fig. 10

METHOD OF MAKING A HIGH FREQUENCY NON-RECIPROCAL CIRCUIT ELEMENT

This is a division of application Ser. No. 08/101,895, filed Aug. 2, 1993, now U.S. Pat. No. 5,379,009.

BACKGROUND OF THE INVENTION

1. Field of the Invention

The present invention relates to a non-reciprocal circuit element which is used in a microwave band, and more particularly, it relates to a structure of a high frequency non-reciprocal circuit element (i.e., one used in high frequency applications) which is usable in a circulator, an isolator or the like, for example.

2. Description of the Background Art

In recent years, high-frequency devices have been increasingly miniaturized and generalized in a mobile communication system or the like. It has therefor become necessary to reduce the size and cost of non-reciprocal circuit elements employed in such devices.

Such a non-reciprocal circuit element includes the so-called lumped parameter non-reciprocal circuit element having a plurality of center electrodes which are arranged to intersect with each other in an electrically insulated state, and high frequency-use magnetic bodies which are arranged on upper and lower sides of the plurality of center electrodes arranged so that do magnetic fields are applied to the plurality of center electrodes by permanent magnets, for example. Examples of such an element are a lumped parameter type circulator, an isolator and the like.

An exemplary method of manufacturing the aforementioned high frequency non-reciprocal circuit element is now described with reference to FIG. 13. A center electrode **32*a* is arranged on a disk shaped high frequency-use magnetic body 31*a*. The center electrode 32*a* radially extends through the center of an upper surface of the high frequency-use magnetic body 31*a*, to reach a side surface of the high frequency-use magnetic body 31*a*. Then, an insulating film 33*a* of an insulating material is arranged on the center electrode 32*a*, and another center electrode 32*b* is arranged thereon to intersect with the center electrode 32*a*. An insulating film 33*b*, a center electrode 32*c* and an insulating film 33*c* are successively arranged on the center electrode 32*b*, and a high frequency-use magnetic body 31*b* is finally placed on and fixed to such a structural body. Thereafter permanent magnets are arranged on upper and lower side of the thus-obtained structure, to apply de magnetic fields to the structural body which is held between the high frequency-use magnetic bodies 31*a* and 31*b***.

In order to manufacture such a conventional high frequency non-reciprocal circuit element, the center electrodes **32*a* to 32*c* are manually arranged alternately with the insulating films 33*a* to 33*c*, as described above with reference to FIG. 13. However, it is extremely difficult to manually assemble the center electrodes 32*a* to 32*c*, which are reduced to about several millimeters in length with miniaturization of the high frequency non-reciprocal circuit element. In a miniature high frequency non-reciprocal circuit element, therefore, imperfect assembling such as relative misregistration of the center electrodes 32*a* to 32*c*** is so frequently caused that it is difficult to obtain a highly reliable high frequency non-reciprocal circuit element.

Further, the manufacturing cost for such a conventional circuit element is increased due to frequent imperfect assembling caused by manual assembling.

While the high frequency non-reciprocal circuit element requires a relatively large number of components as hereinabove described, it is difficult to reduce the cost therefor due to restriction in cost reduction for the respective components.

SUMMARY OF THE INVENTION

An object of the present invention is to provide a high frequency non-reciprocal circuit element, which can be reduced in size and cost with a structure exhibiting improved reliability.

According to a broad aspect of the present invention, provided is a high frequency non-reciprocal circuit element comprising a high frequency magnetic body and a plurality of center electrodes which are included inside the high frequency-use magnetic body and arranged to intersect with each other while in a state being electrically insulated from each other.

Throughout the specification, the term "high frequency magnetic body" indicates a magnetic body which is suitable for forming the aforementioned non-reciprocal circuit element in a microwave band. This high frequency-use magnetic body is not restricted to a magnetic body which is obtained by stacking a plurality of magnetic green sheet layers and firing the thus-obtained laminate as described later with reference to preferred embodiments of the present invention, but also includes, inter alia, a magnetic body which is formed by adhering a plurality of previously fired magnetic plates with each other with an adhesive or the like. In any case, a feature of the present invention resides in that the plurality of center electrodes are include within such a high frequency magnetic body to make an integrated structure therewith.

The manufacturing method according to the present invention is adapted to prepare a laminate of high frequency magnetic layers and a plurality of center electrodes which are alternately stacked so that the center electrodes intersect with each other while in a state being electrically insulated from each other, and to fire the laminate, thereby obtaining a high frequency non-reciprocal circuit element. In this case, the unfired high frequency magnetic layers which are stacked alternately with the center electrodes can be prepared from previously shaped unfired magnetic green sheets or unfired magnetic layers formed by applying and hardening magnetic paste.

According to another aspect of the present invention, the aforementioned high frequency non-reciprocal circuit element is obtained by preparing high frequency magnetic plates which are provided with first center electrodes on at least one single major surfaces thereof and bonding such high frequency magnetic plates with each other through an adhesive.

The high frequency non-reciprocal circuit element according to the present invention generally includes a non-reciprocal circuit element having a high frequency magnetic body provided on intersecting portions of a plurality of center electrodes which are so arranged as to intersect with each other in a state being electrically insulated from each other as described above, with dc magnetic fields applied thereto by permanent magnets, such as a lumped parameter high frequency non-reciprocal circuit element usable in to a circulator or an isolator, for example.

As hereinabove described, the high frequency non-reciprocal circuit element according to the present invention has such an integrated structure that the center electrode portions are included within the high frequency magnetic body. Therefore, it is possible to obtain a high frequency-use non-reciprocal circuit element which is extremely smaller in size as compared with a conventional high frequency non-reciprocal circuit element having center electrodes which are assembled by hand. Since it is possible to omit a manual assembling step in the present invention, imperfect assembling such as misregistration of the center electrodes is hardly caused and it is possible to effectively reduce the manufacturing cost.

Thus, it is possible to provide a high frequency non-reciprocal circuit element which is small in size and excellent in reliability at a low cost. According to the present invention, therefore, it is possible to contribute to miniaturization, generalization and cost reduction in a high frequency device which is employed for a mobile communication system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9(*a*) to 9(*c*) are perspective views for illustrating center electrodes employed in a fourth embodiment of the present invention respectively;

FIG. 10 is a sectional view for illustrating a step of stacking the center electrodes and magnetic green sheets for obtaining a compact in the fourth embodiment of the present invention;

DESCRIPTION OF THE PREFERRED EMBODIMENTS

Description is now made on embodiments of the inventive high frequency-use non-reciprocal circuit element with reference to the drawings, thereby clarifying the present invention.

First Embodiment

Figure 1:
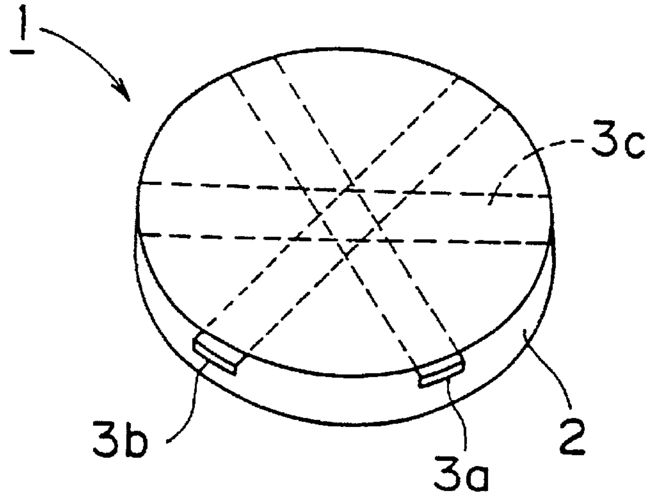
FIG. 1 is a perspective view showing a high frequency non-reciprocal circuit element according to a first embodiment of the present invention.

FIG. 1 is a perspective view showing a high frequency-use non-reciprocal circuit element 1 according to a first embodiment of the present invention. The high frequency non-reciprocal circuit element 1 has a structure obtained by embedding a plurality of center electrodes 3*a*, 3*b* and 3*c* in a disk shaped high frequency magnetic body 2 and integrating the same. The plurality of center electrodes 3*a*, 3*b* and 3*c* are arranged to intersect each other at intervals of about 120°, as shown in FIG. 1, while being electrically insulated from each other through magnetic layers. Opposite ends of each of the center electrodes 3*a*, 3*b* and 3*c* are exposed on a side surface of the high frequency magnetic body 2.

The high frequency non-reciprocal circuit element 1 is used, for example, as a circulator or an isolator. An exemplary method of manufacturing the high frequency non-reciprocal circuit element 1 is now described with reference to FIG. 2.

First, magnetic powder which is mainly composed of yttrium oxide ($Y_2O_3$) and iron oxide ($Fe_2O_3$) is mixed with an organic binder and an organic solvent, to obtain a magnetic slurry. The magnetic slurry is shaped into magnetic green sheets 2*a*, 2*b* and 2*c* of 10 which are several 10 μm thick by a doctor blade coater.

Conductive paste which is preferably prepared by mixing conductive powder of palladium or platinum with an organic solvent is printed on upper surfaces of the magnetic green sheets 2*a*, 2*b* and 2*c* by screen printing, thereby forming the center electrodes 3*a*, 3*b* and 3*c*. Thereafter the magnetic green sheets 2*a*, 2*b* and 2*c* are so arranged and stacked that the center electrodes 3*a*, 3*b* and 3*c* intersect each other at angles of about 120°, and an appropriate number of magnetic green sheets, provided with no center electrode, are stacked on upper and lower portions of the stacked green sheets. These layers are pressurized along the direction of their thickness to obtain a compact laminate. Then, the laminate is fired in a furnace at a temperature of 1300° to 1600° C., thereby obtaining the non-reciprocal circuit element 1 having the magnetic body 2 and the center electrodes 3*a*, 3*b* and 3*c* embedded therein.

In the non-reciprocal circuit element 1 according to this embodiment, the plurality of center electrodes 3*a*, 3*b* and 3*c* are formed by printing conductive paste on the upper surfaces of the magnetic green sheets 2*a* to 2*c* and these center electrodes 3*a*, 3*b* and 3*c* are electrically insulated from each other by magnetic layers formed by the magnetic green sheets 2*a* to 2*b*, as hereinabove described. Thus, it is possible not only to omit an operation of manually assembling a plurality of center electrode portions, but to position the plurality of center electrodes 3*a* to 3*c* in a highly accurate manner. Therefore, it is possible to manufacture the high frequency non-reciprocal circuit element 1, which is smaller in size than and superior in reliability to the prior art, at a low cost.

In the high frequency non-reciprocal circuit element 1 according to the first embodiment, the plurality of center electrodes 3*a*, 3*b* and 3*c* are separated by the disk shaped high frequency magnetic body 2 to intersect with each other while being electrically insulated from each other through the magnetic layers. While a preferred embodiment has been disclosed, the high frequency non-reciprocal circuit element according to the first embodiment can be formed to have another shape and another circuit structure.

For example (see FIG. 3), a plurality of center electrodes 3*a*, 3*b* and 3*c* may be arranged in a high frequency magnetic body 2, which is in the form of a rectangular plate, to intersect with each other while being electrically insulated from each other through magnetic layers, and capacitance electrodes 4*a* to 4*c* forming capacitors which are electrically connected with the center electrodes 3*a*, 3*b* and 3*c* may be embedded in the high frequency magnetic body 2 to attain an integral structure including matching capacitors.

Figure 3:
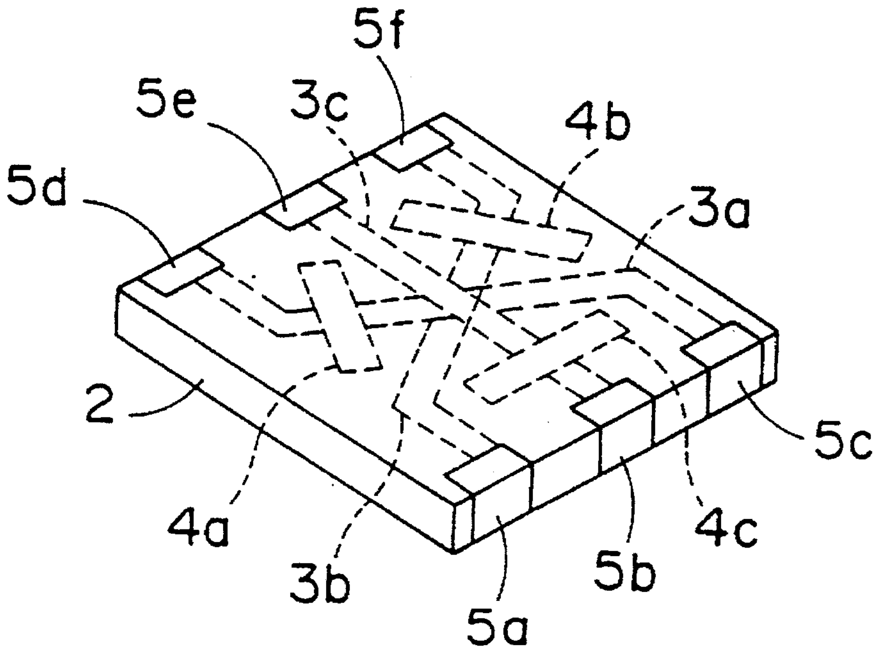
FIG. 3 is a perspective view showing a modification of the first embodiment.

Referring to FIG. 3, numerals 5*a* to 5*f* respectively denote terminal electrodes, which are formed on both side surfaces of the high frequency magnetic body 2 being in the form of a rectangular plate, to be electrically connected to opposite ends of the plurality of center electrodes 3*a*, 3*b* and 3*c*.

The magnetic green sheets 2*a* to 2*c* may be molded by a method such as extrusion molding, for example, in place of using the doctor blade coater. Further, the center electrodes 3*a* to 3*c* may also be formed by a method such as gravure transfer, for example, in place of screen printing.

Second Embodiment

Figure 4:
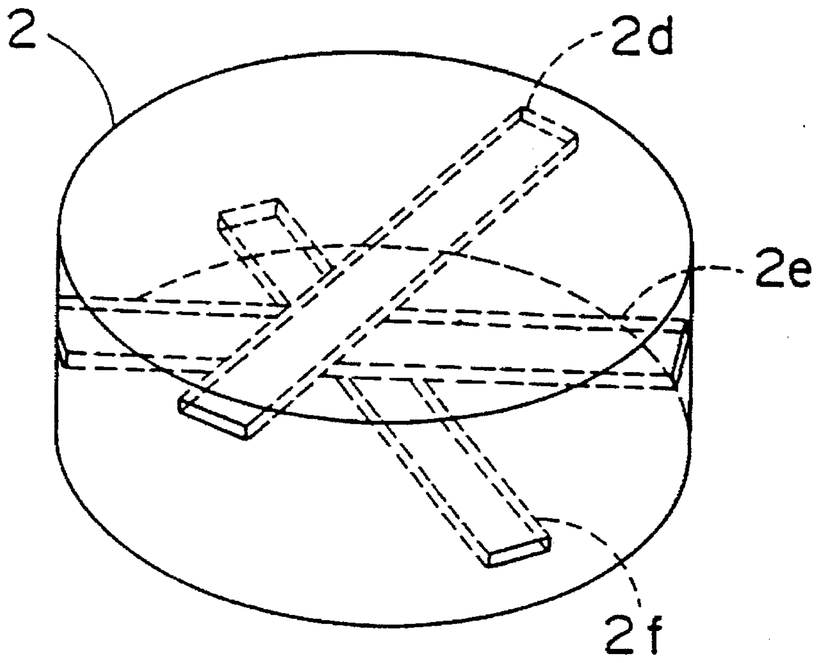
FIG. 4 is a perspective view showing a second embodiment of the present invention, with cavities formed in portions of a high frequency magnetic body to be provided with central electrodes.
Figure 5:
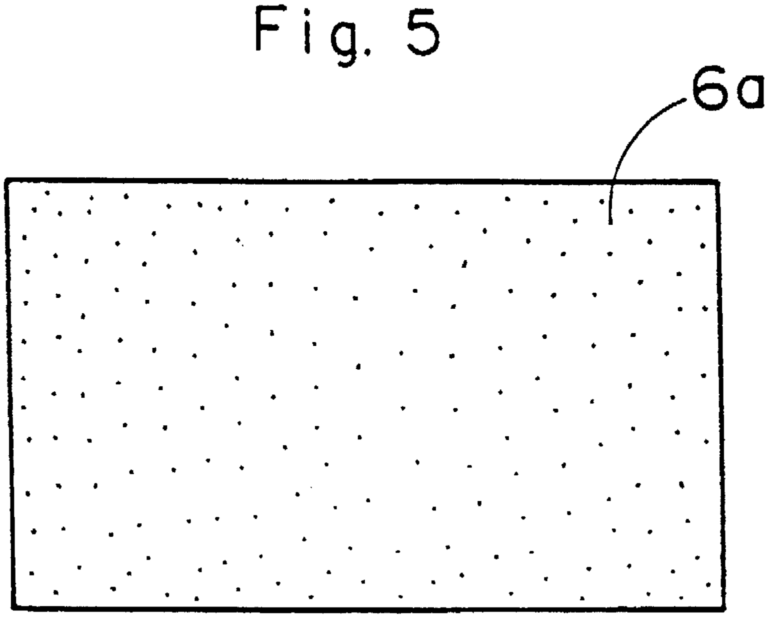
FIG. 5 is a plan view showing a third embodiment of the present invention, in a state provided with a first layer of a magnetic body.

Referring to FIG. 4, a method of manufacturing a high frequency non-reciprocal circuit element according to a second embodiment of the present invention is now described, to clarify the structure of the non-reciprocal circuit element according to this embodiment.

Figure 2:
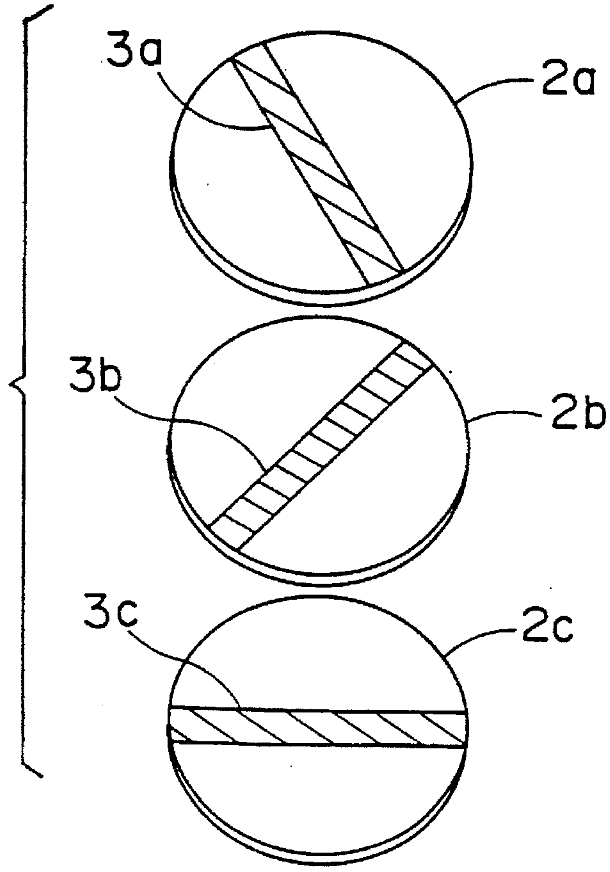
FIG. 2 is a perspective view showing a step of preparing the high frequency non-reciprocal circuit element according to the first embodiment of the present invention, with a plurality of magnetic green sheets on which center electrodes are printed.

First, magnetic green sheets which are identical to the magnetic green sheets 2*a*, 2*b* and 2*c* shown in FIG. 2 are so prepared that a non-conductive paste containing an inflammable material such as carbon paste, which is decomposed or burned to disappear in firing of the magnetic green sheets, or paste of a mixture of such an inflammable material and magnetic powder is printed on upper surfaces of the magnetic green sheets in the same form as the center electrodes 3*a* to 3*c*.

Then, the magnetic green sheets are stacked so that the paste members printed in the form of center electrodes intersect with each other, and appropriate numbers of magnetic green sheets having no printed electrodes are stacked on upper and lower portions of the laminate and compression-bonded along the direction of thickness to obtain a compact laminate. Thereafter the compact laminate is fired in a firing furnace at a temperature of 1300° to 1600° C., thereby obtaining a cylindrical high frequency magnetic body 2 shown in FIG. 4.

In the high frequency-use magnetic body 2, cavities 2*d*, 2*e* and 2*f* are defined in portions on which the paste of the aforementioned inflammable material or the mixture of the inflammable material and magnetic powder has been printed. Namely, sidewardly exposed cavities 2*d* to 2*f* are formed in portions to be provided with center electrodes.

Then, the high frequency magnetic body 2 is dipped in a vessel storing a metal having a low melting point such as lead, tin or an alloy thereof in a molten state and pressurized, so that the cavities 2*d* to 2*f* are filled up with the molten metal. Thereafter the high frequency-use magnetic body 2 is taken out from the vessel and naturally cooled, thereby forming center electrodes in the portions provided with the cavities 2*d* to 2*f*.

Through the aforementioned steps, it is possible to obtain a structural body which is similar in structure to the high frequency non-reciprocal circuit element 1 shown in FIG. 1, with a plurality of center electrodes 3*a* to 3*c* embedded in and integrated with the high frequency magnetic body 2. Thus, it is possible to manufacture a miniature high frequency non-reciprocal circuit element having high reliability, similarly to the first embodiment.

Third Embodiment

Referring to FIGS. 5 to 8, a method of manufacturing a high frequency non-reciprocal circuit element according to a third embodiment of the present invention is now described, to clarify the structure of the high frequency non-reciprocal circuit element according to this embodiment.

First, magnetic powder which is mainly composed of yttrium oxide ($Y_2O_3$) and iron oxide ($Fe_2O_3$) is mixed with an organic binder and an organic solvent, to obtain magnetic paste. This magnetic paste is applied onto a film of synthetic resin such as polyester, for example, and dried to form a magnetic body 6*a* shown in FIG. 5.

Figure 6:
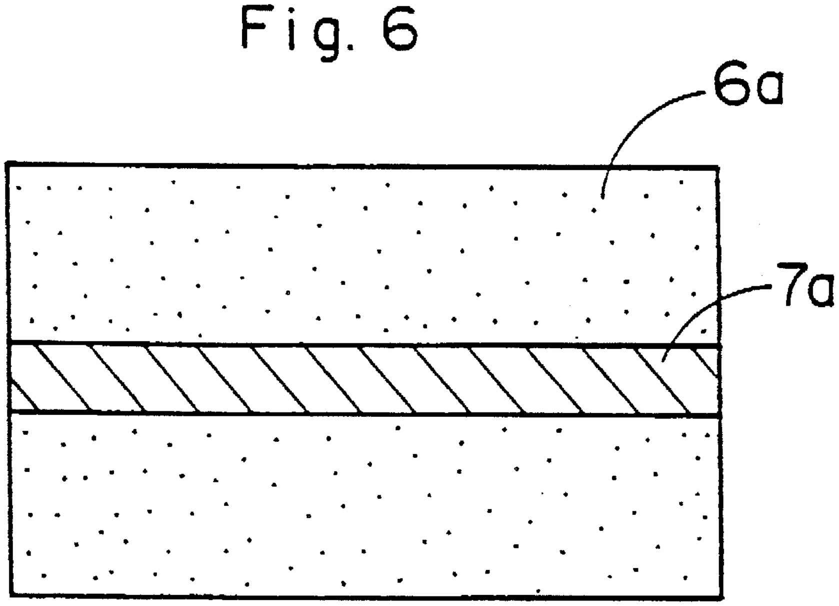
FIG. 6 is a plan view showing the third embodiment of the present invention, with a center electrode printed on the magnetic body.
Figure 7:
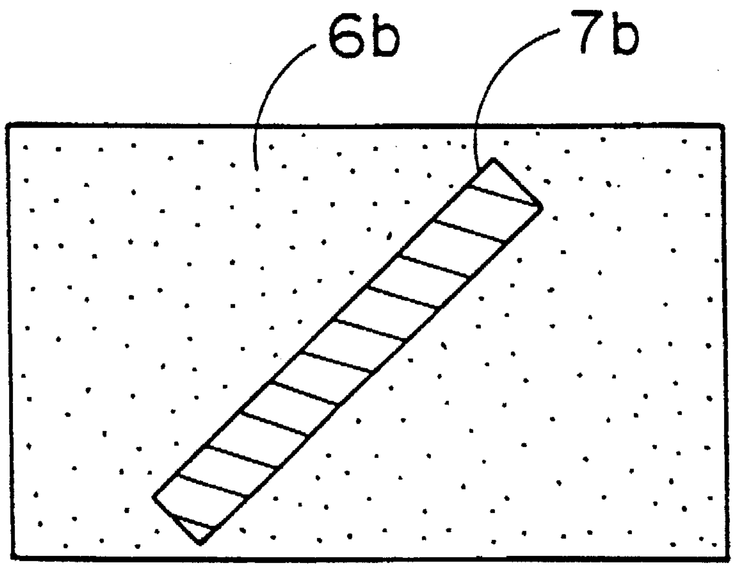
FIG. 7 is a plan view showing the third embodiment of the present invention, with another center electrode printed on another magnetic body.

Then, conductive paste prepared by mixing palladium powder and an organic solvent is applied onto the magnetic body 6*a* as shown in FIG. 6, to form a center electrode 7*a* and is dried. Further, magnetic paste is applied onto both the magnetic body 6*a* and the center electrode 7*a* and is dried to form a magnetic body 6*b* shown in FIG. 7. Then, conductive paste is applied onto the magnetic body 6*b* again and dried to form a center electrode 7*b*.

Figure 8:
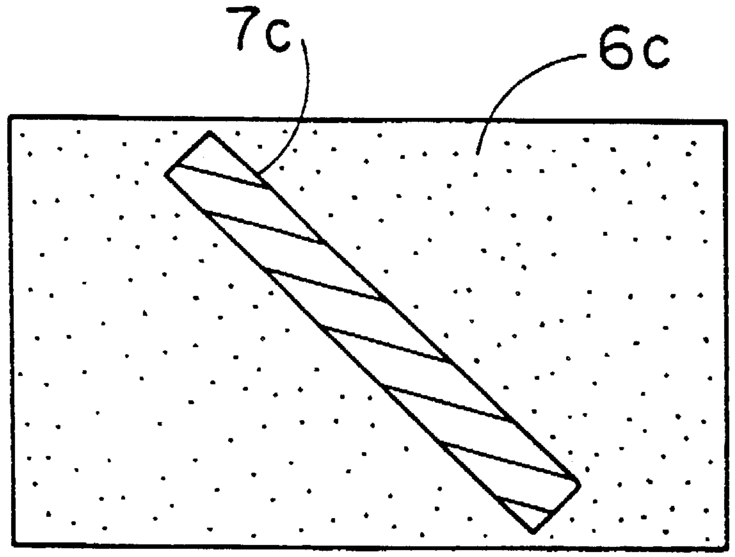
FIG. 8 is a plan view showing the third embodiment of the present invention, with still another center electrode printed on still another magnetic body.

Further, magnetic paste is applied onto the magnetic body 6*b* and the center electrode 7*b* again as shown in FIG. 8 and dried to form a magnetic body 6*c*, and conductive paste is applied onto the same and dried to form a center electrode 7*c*. Thereafter magnetic paste is applied onto the magnetic body 6*c* and the center electrode 7*c* and dried to obtain a compact so that intersecting portions of the center electrodes 7*a* to 7*c* are located on its center.

The so obtained compact is fired at a temperature of 1300° to 1600° C., thereby obtaining a high frequency non-reciprocal circuit element having a similar structure to the high frequency non-reciprocal circuit element 1 shown in FIG. 1.

In the third embodiment, as hereinabove described, magnetic films and center electrodes are alternately applied or printed, dried and stacked to obtain a laminate, which in turn is fired similarly to the first embodiment to obtain a high frequency non-reciprocal circuit element comprising a plurality of center electrodes embedded in and integrated with a high frequency magnetic body.

Also according to the third embodiment, therefore, it is possible to manufacture a high frequency non-reciprocal circuit element which is smaller in size and higher in reliability than the prior art at a low cost.

While the magnetic layer 6*a* is formed by applying magnetic paste and drying the same in the third embodiment, the magnetic layer 6*a* may be replaced by a magnetic green sheet which is employed in the first or second embodiment, so that the center electrodes and the remaining magnetic layers are formed thereon by application or printing, to obtain a laminate.

Fourth Embodiment

As shown in FIGS. 9(*a*) to 9(*c*), three center electrodes 8 to 10 have top plate portions 8*a*, 9*a* and 10*a* and pairs of side plate portions 8*b,* 9*b* and 10*b* extending downwardly from opposite ends of the top plate portions 8*a* to 10*a*. As clearly understood from FIGS. 9(*a*) to 9(*c*), the lengths of the side plate portions 8*b,* 9*b* and 10*b* increase successively from the center electrode 8 toward the center electrode 10.

Then, a molding die 11 having an upwardly opening drag 11*a* and a cope 11*b* is so prepared that magnetic green sheets 2*a,* 2*b* and 2*c,* which are similar to those in the first embodiment but having no center electrodes printed on upper surfaces thereof, are inserted in the drag 11*a* alternately with the center electrodes 8 to 10 and a proper number of magnetic green sheets are inserted on the uppermost part, and the cope 11*b* is downwardly moved to compress the laminate, thereby obtaining a compact laminate.

Then, the obtained compact is fired at a temperature of 1300° to 1600° C., to obtain a high frequency non-reciprocal circuit element, which is similar in structure to the high frequency non-reciprocal circuit element 1 shown in FIG. 1.

While the center electrodes 8 to 10 are previously formed by working metal plates in the fourth embodiment of the present invention as hereinabove described, it is possible to obtain the high frequency non-reciprocal circuit element 1 having the center electrodes 8 to 10 which are embedded in and integrated with a high frequency magnetic body by stacking the center electrodes 8 to 10 alternately with the magnetic green sheets as described above.

Also in the high frequency non-reciprocal circuit element according to the fourth embodiment, therefore, a high frequency-use magnetic body is homogeneously arranged around the center electrodes 8 to 10 in high density and the compact is obtained through the molding die 11, whereby it is possible to obtain a miniature high frequency non-reciprocal circuit element having excellent reliability. Further, the compact of the center electrodes 8 to 10 and the magnetic green sheets is manufactured through the molding die 11, whereby it is possible to manufacture the high frequency non-reciprocal circuit element at a lower cost as compared with a conventional method of manually assembling center electrodes, a high frequency magnetic body and an insulating film.

Also in the fourth embodiment, the magnetic green sheets may be replaced by the magnetic paste employed in the second embodiment. In other words, the magnetic paste may be injected after the center electrodes 8 to 10 are inserted in the die 11. In addition, the magnetic green sheets may be replaced by magnetic powder.

Fifth Embodiment

Figure 11:
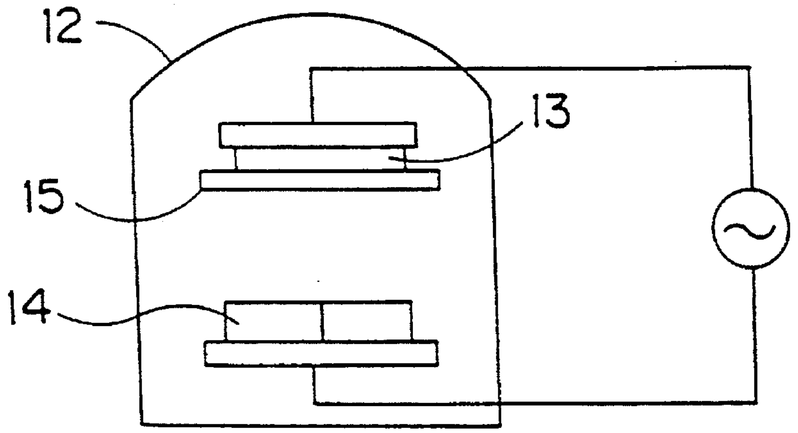
FIG. 11 is a schematic block diagram for illustrating an apparatus for forming a magnetic film and a metal film for preparing a center electrode in a fifth embodiment of the present invention.

Referring to FIG. 11, a method of manufacturing a high frequency non-reciprocal circuit element according to a fifth embodiment of the present invention is now described, to clarify the high frequency non-reciprocal circuit element according to this embodiment.

Referring to FIG. 11, a vacuum deposition substrate 13 of, for example, a copper plate, is arranged in a vacuum vessel 12 of a sputtering unit to face a sintered body target 14 of, for example, yttrium iron garnet at a prescribed distance. Then, a magnetic film of the same composition as the target 14 is formed on a surface of the vacuum deposition substrate 13 by sputtering. Then, the so-formed magnetic film is coated with a mask 15 covering portions other than those which are to be provided with a center electrode, and another target of a conductive material such as copper is arranged in place of the sintered body target 14 and subjected to sputtering, to be provided with a center electrode. The steps of forming a magnetic film and a center electrode by sputtering are so repeated that it is possible to obtain an integral structural body having center electrodes embedded in a magnetic body, as shown in FIG. 11.

According to this embodiment, magnetic films and center electrodes are stacked/formed by sputtering as hereinabove described, whereby it is possible to manufacture a miniature high frequency non-reciprocal circuit element having high reliability at a low cost, similarly to the first embodiment.

The vacuum deposition substrate 13 can be directly applied to an earth electrode for forming an actual non-reciprocal circuit element.

While the magnetic films and the center electrodes are formed by sputtering in the fifth embodiment, it is also possible to employ another thin film forming technique such as ion plating, thermal spraying, an ion beam method, vapor deposition or vacuum deposition, to form a high frequency non-reciprocal circuit element in a similar manner to the above. When magnetic films are formed by such a thin film forming method, oxide magnetic films may be formed by oxidizing a metal.

Sixth Embodiment

Figure 12:
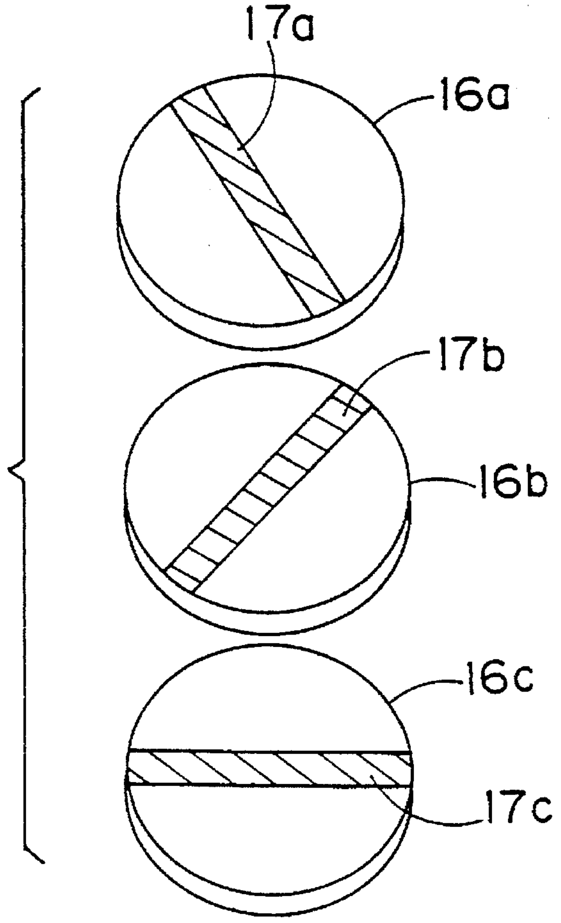
FIG. 12 is an exploded perspective view showing magnetic plates, on which center electrodes are printed, employed in a sixth embodiment of the present invention.
Figure 13:
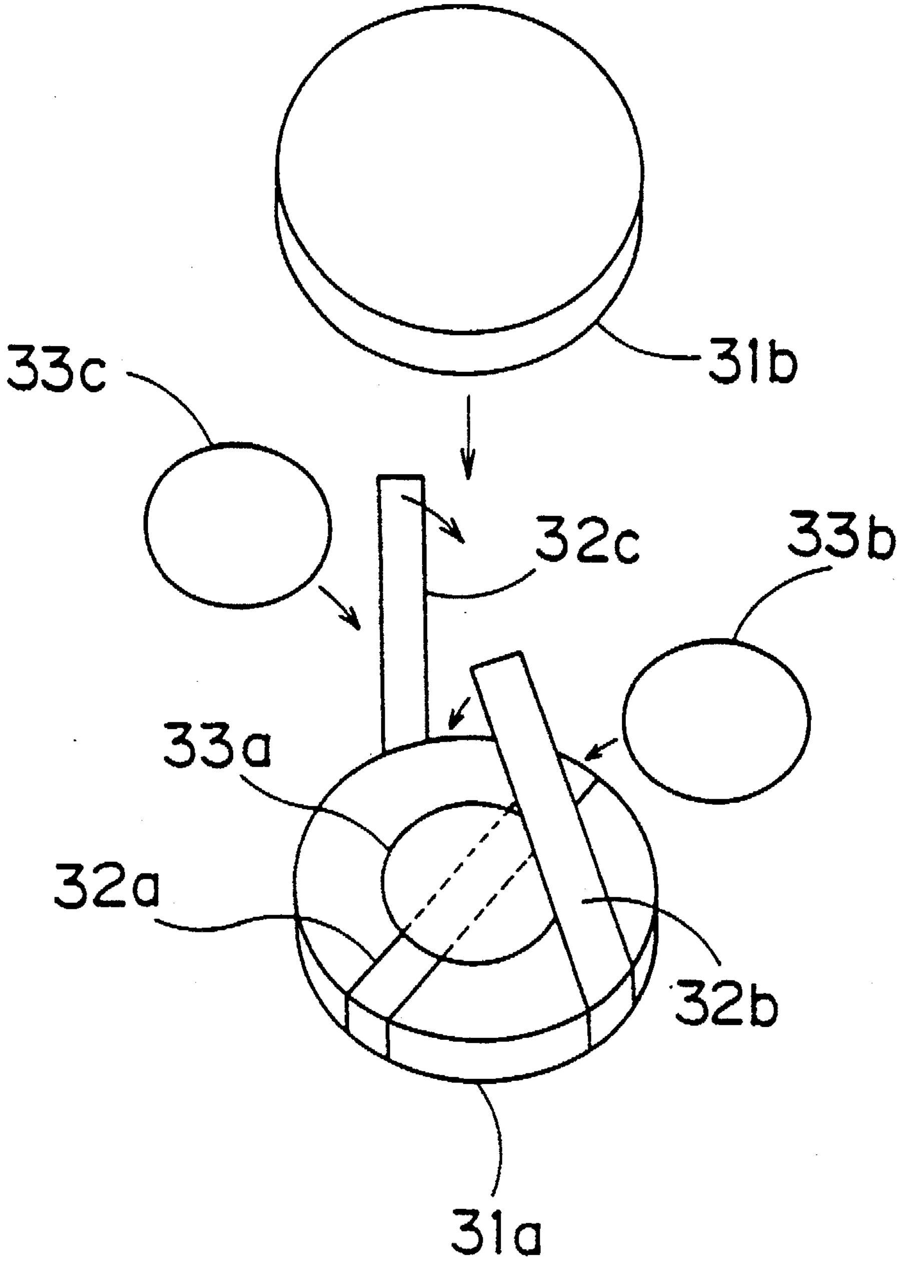
Fig. 13 PRIOR ART
FIG. 13 is a perspective view for illustrating a step of assembling a conventional high frequency non-reciprocal circuit element.

FIG. 12 is an exploded perspective view for illustrating a high frequency non-reciprocal circuit element according to a sixth embodiment of the present invention. According to this embodiment, three magnetic plates 16*a,* 16*b* and 16*c* are prepared as shown. Each of the magnetic plates 16*a* to 16*c* is obtained by stacking a plurality of magnetic green sheets prepared in the first embodiment, working the same into proper dimensions and thereafter firing the same at a temperature of 1300° to 1600° C.

After the magnetic plates 16*a,* 16*b* and 16*c* are obtained by such firing, conductive paste which is prepared by mixing silver powder and an organic solvent, for example, is printed on the magnetic plates 16*a,* 16*b* and 16*c,* to form center electrodes 17*a,* 17*b* and 17*c,* respectively. The center electrodes 17*a,* 17*b* and 17*c* are so printed as to pass through centers of the disk shaped magnetic plates 16*a,* 16*b* and 16*c* and radially extend along them.

Then, the magnetic plates 16*a,* 16*b* and 16*c* are so arranged as to direct the center electrodes 17*a,* 17*b* and 17*c* as shown in FIG. 12 respectively, and paste containing lead borosilicate glass or the like serving as a bonding agent is applied between the magnetic plates 16*a* to 16*c,* which in turn are stacked and fired at a temperature of 900° to 1000° C. Through such firing, it is possible to obtain a high frequency non-reciprocal circuit element, in which a plurality of center electrodes are embedded and integrated with each other similarly to the high frequency non-reciprocal circuit element shown in FIG. 1.

Also according to this embodiment, a plurality of center electrodes and high frequency magnetic bodies are formed by stacking fired magnetic plates 16*a* to 16*c* and integrally firing the same. Thus, it is possible to manufacture a miniature high frequency non-reciprocal circuit element having high reliability, similarly to the first embodiment.

Although each of the magnetic plates 16*a* to 16*c* is prepared by stacking a plurality of magnetic green sheets and firing the same in this embodiment, such magnetic plates 16*a* to 16*c* may alternatively be formed by press-molding magnetic powder.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a high frequency non-reciprocal circuit element, said method comprising the steps of:

forming an unfired laminate having a plurality of center electrodes which are located between a plurality of unfired magnetic layers such that said center electrodes are embedded in said laminate and said center electrodes are electrically insulated from each other by said unfired magnetic layers such that said center electrodes intersect but do not totally overlap each other; and firing said laminate.

2. A method of manufacturing a high frequency non-reciprocal circuit element in accordance with claim 1, wherein said unfired magnetic layers are previously molded magnetic green sheets.

3. A method of manufacturing a high frequency non-reciprocal circuit element in accordance with claim 2, wherein said center electrodes are formed by using magnetic green sheets as said unfired magnetic layers and printing conductive paste on single major surfaces of said green sheets.

4. A method of manufacturing a high frequency non-reciprocal circuit element in accordance with claim 1, wherein said unfired magnetic layers are prepared by applying a magnetic paste to respective support surfaces and hardening said magnetic paste.

5. A method of manufacturing a high frequency non-reciprocal circuit element in accordance with claim 4, wherein at least one of said unfired magnetic layers is prepared by applying a magnetic paste to a surface of another of said magnetic layers.

6. A method of manufacturing a high frequency non-reciprocal circuit element in accordance with claim 1, wherein said center electrodes are formed in such a manner that they are embedded within said unfired magnetic layers.

7. A method of manufacturing a high frequency non-reciprocal circuit element, said method comprising the steps of:

forming an unfired laminate having a plurality of center electrodes which are located between a plurality of unfired magnetic layers such that said center electrodes are embedded in said unfired magnetic layers and are separated from each other by said unfired magnetic layers such that said center electrodes intersect but do not totally overlap each other, at least one of said unfired magnetic layers being prepared by applying a magnetic paste to a support surface of another of said unfired magnetic layers and hardening said magnetic paste; and firing said laminate.

8. A method of manufacturing a high frequency non-reciprocal circuit element, said method comprising:

a step of printing paste, which is capable of being vanished under a firing temperature of an unfired magnetic green sheet, on said magnetic green sheet in the form of a target center electrode;

a step of obtaining a laminate by stacking a plurality of said magnetic green sheets;

a step of firing said laminate for forming cavities in regions having been provided with paste printed thereon and obtaining a high frequency-use magnetic body; and a step of injecting a molten metal in said cavities and solidifying the same thereby forming center electrodes.

9. A method of manufacturing a high frequency non-reciprocal circuit element in accordance with claim 8, wherein said paste containing a material capable of being vanished at a firing temperature for said magnetic green sheet is paste containing carbon.

10. A method of manufacturing a high frequency non-reciprocal circuit element, said method comprising:

a step of preparing a previously fired magnetic plate;

a step of forming a center electrode on a single major surface of said magnetic plate; and a step of connecting plurality of said magnetic plates provided with said center electrodes through an adhesive.

* * * * *